United States Patent Office 3,314,752
Patented Apr. 18, 1967

3,314,752
SYNTHETIC ZEOLITE
George T. Kerr, Delaware Township, Camden County, N.J., assignor to Mobil Oil Corporation, a corporation of New York
No Drawing. Filed Aug. 30, 1961, Ser. No. 134,841
20 Claims. (Cl. 23—113)

This invention relates to a new synthetic zeolite and to a method for preparing the same.

Crystalline aluminosilicate zeolites structurally consist basically of an open three-dimensional framework of $SiO_4$ and $AlO_4$ tetrahedra. Such tetrahedra are cross-linked by the sharing of oxygen atoms, so that the ratio of oxygen atoms to the total of the aluminum and silicon atoms is equal to two. The negative electrovalence of tetrahedra containing aluminum is balanced by the inclusion within the crystal of cations, such as alkali or alkaline earth metal ions.

Many zeolites possess a crystal structure, having channels of molecular dimensions. The interstitial spaces are generally originally occupied by water of hydration. After at least partial dehydration, these zeolites may be utilized as efficient adsorbents whereby adsorbate molecules are retained within the interstitial spaces. The interstitial dimensions of openings in the crystal lattice limit the size and shape of the molecules that can be adsorbed. A separation of a mixture of various molecules, based upon molecular dimensions, wherein certain molecules are adsorbed by the zeolite while others are excluded from admission is therefore possible. It is such characteristic of many crystalline zeolites that has led to their designation as "molecular sieves."

A number of synthetic crystalline zeolites have previously been prepared. They are distinguishable from each other and from naturally occurring zeolites on the basis of composition, cystal structure and adsorption properties. The existence of a number of zeolites having similar but distinguishable properties advantageously permits the selection of a particular member having optimum properties for a particular use.

Thus, it has heretofore been known to prepare a synthetic zeolite known as "zeolite A." Such material and preparation thereof has been described in U.S. 2,882,243. This zeolite is initially obtained in its sodium form, i.e. as a sodium aluminosilicate. Such material is capable of effectively sorbing water and straight chain compounds of three or less carbon atoms such as methane, ethane, n-propane, methanol, ethanol, n-propanol and the like. Sodium zeolite A, however, is incapable of adsorbing, to an appreciable extent, straight chain compounds having more than three atoms in the chain. Thus, it is only after replacement, by ion exchange, of a substantial proportion of the sodium ions of the initially obtained sodium zeolite A with divalent ions, such as calcium or magnesium that the pore characteristics thereof are such as to effect separation of straight chain hydrocarbons of more than 3 carbon atoms from admixture with branch chain or cyclic compounds. Sodium zeolite A, known commercially as Molecular Sieve 4A, is thus incapable of admitting into its crystalline structure molecules for which the maximum dimension of the minimum projected cross-section is greater than about 4.9 Angstroms. In order to produce a zeolite A capable of effecting separation of mixtures of straight chain and branched chain molecules or for separation of straight chain molecules from cyclic compounds having four or more atoms, it has heretofore been necessary to first carry out exchange of the initially obtained sodium zeolite A with another ion, such as calcium or magnesium, and to thereby effect exchange of the sodium ions to the extent of at least about 40 percent with such substituting ion. The resulting product, in which calcium is the introduced ion, is known commercially as Molecular Sieve 5A. This zeolite has larger pore dimensions than does the 4A sieve and permits adsorption of molecules for which the maximum dimension of the minimum projected cross-section is about 5.5 Angstroms.

In accordance with the present invention, there is provided a new zeolite which essentially in its sodium form, the form in which the zeolite is obtained from the preparative reaction mixtures, is capable of accomplishing separation of straight chain molecules having more than three atoms in the chain from non-straight chain, i.e. from branched chain and/or cyclic, molecules of more than three atoms without the necessity of converting such form zeolite into another ionic form by prior base-exchange such as has heretofore been essential in achieving a synthetic zeolite of the above requisite pore characteristics. The new zeolite, so provided, is hereinafter referred to as "zeolite ZK-4."

The composition of zeolite ZK-4 can stoichiometrically be expressed, in terms of mole ratios of oxides as follows:

0.1 to $0.3R:0.7$ to $1.0X_2O:1Al_2O_3:2.5$ to $4.0SiO_2 \cdot YH_2O$ where R is selected from the group consisting of a methyl ammonium oxide, hydrogen oxide and mixtures thereof with one another; X is selected from the group consisting of sodium and potassium and Y is any value from about 3.5 to about 5.5, said material being capable of selectively sorbing straight chain hydrocarbons of more than three carbon atoms from admixture of the same with non-straight chain hydrocarbons when X is sodium and capable of selectively sorbing water from admixture of the same with straight chain molecules having more than three atoms in the chain when X is potassium. Minor variations in the mole ratios of these oxides within the range indicated by the above formula do not significantly change the crystal structure or physical properties of the zeolite.

In one embodiment, the present invention is directed to a crystalline synthetic material having the composition:

0.1 to $0.3R:0.7$ to $1.0Na_2O:1Al_2O_3:2.5$ to $4.0SiO_2 \cdot YH_2O$ where R and Y have the above designated significance and which material is capable of selectively sorbing straight chain hydrocarbons of more than three carbon atoms from admixture of the same with non-straight chain hydrocarbons.

In another embodiment, the invention is directed to a crystalline synthetic material having the composition:

0.1 to $0.3R:0.7$ to $1.0K_2O:1Al_2O_3:2.5$ to $4.0SiO_2 \cdot YH_2O$ where R and Y have the above designated significance and which material is capable of selectively sorbing water from admixture of the same with straight chain molecules having more than three carbon atoms in the chain.

In still another embodiment, the invention provides for a crystalline synthetic material having the composition:

0.1 to $0.3M_2O:0.7$ to $1.0X_2O:1Al_2O_3:2.5$ to $4.0SiO_2 \cdot YH_2O$ where X and Y have the above designated significance and M is a methyl ammonium ion.

The methyl ammonium ion is introduced upon crystallization of zeolite ZK–4 from a reaction mixture containing a tetramethylammonium ion and may, depending on the temperature conditions to which the zeolite is subjected, be a mono, di, tri or tetra methyl substituted ammonium ion or a mixture of such substituted ions. Upon thermal activation of the product, i.e by heating in an inert atmosphere at a temperature in the approximate range of 200 to 600° C., the methyl ammonium ion undergoes degradation to hydrogen ion.

It is a particular embodiment of the present invention that zeolite ZK-4 is prepared from reaction mixtures containing a tetramethylammonium ion and more specifically, by heating in aqueous solution a mixture of the oxides or of materials whose chemical compositions can be completely represented as mixtures of the oxides $Na_2O$, $Al_2O_3$, $[(CH_3)_4N]_2O$, $SiO_2$ and $H_2O$ suitably at a temperature of about 100° C. for periods of time ranging from 15 minutes to 90 hours or longer. The composition of the reaction mixture, expressed in terms of mole ratios of oxides, preferably falls within the following ranges:

$SiO_2/Al_2O_3$ of from about 2.5 to about 11.

$\dfrac{H_2O}{Na_2O+[(CH_3)_4N]_2O}$ of from about 25 to about 50

$\dfrac{Na_2O+[(CH_3)_4N]_2O}{SiO_2}$ of from about 1 to about 2

The product which crystallizes from the hot reaction mixture is separated, suitably by centrifuging or filtration, washed with water until the effluent wash water in equilibrium with the zeolite has a pH of from about 9 to 12. The material, so obtained, is thereafter activated by heating in an inert atmosphere at a temperature in the approximate range of 200 to 600° C.

In making zeolite ZH-4, the usual method comprises reacting, in aqueous media, sodium aluminate or an amorphous sodium aluminosilicate gel with tetramethylammonium silicate, or tetramethylammonium disilicate pentahydrate in a solution of tetramethylammonium hydroxide. Alternatively, an amorphous sodium aluminosilicate gel having a high silica to alumina ratio, i.e. greater than about 2.5, may be reacted in aqueous media with tetramethylammonium hydroxide solution. The reaction is carried out in a suitable vessel made, for example, of metal or glass and capable of closure to prevent loss of water. The reaction mixture is initially continuously or periodically stirred to insure homogeneity. After this mixing, agitation may be stopped as it is unnecessary to agitate the reaction mass during the formation and crystallization of the zeolite, although mixing during such latter stages has not been found to be detrimental.

The crystallization procedures can be satisfactorily carried out at temperatures within the range of from about 100° C. to about 120° C., the pressure being atmospheric or at least that corresponding to the vapor pressure of water in equilibrium with the mixture of reactants. While temperatures as low as about 20° C. may be employed, such lower temperatures require a long reaction period. Preferably, a temperature of approximately 100° C. is employed. Heating is continued until the desired crystalline zeolite product is formed. The zeolite crystals are then separated from the mother liquor and washed, preferably with distilled water, until the effluent wash water after in equilibrium with the product has a pH of between about 9 and about 12.

For satisfactory use as an adsorbent, zeolite ZK-4 should be activated by at least partial dehydration. Such activation can be effected, for example, by heating the zeolite to temperatures within the approximate range of 200 to 600° C. in an inert atmosphere, such as air or nitrogen, under atmospheric or reduced pressure, or by maintaining the zeolite at room temperature under vacuum.

In the synthesis of zeolite ZK-4, it has been found that the composition of the reaction mixture is critical. Specifically, the presence in such mixture of tetramethylammonium ions has been found to be essential for the production of zeolite ZK-4. In the absence of such ions or even in the presence of quaternary ammonium ions other than tetramethyl, as will be evident from data hereinafter set forth, no zeolite ZK-4 was obtained. The crystallization temperature and the length of time the crystallization temperature is maintained are important variables in determining the yield of crystalline material. Under some conditions, for example too low a temperature for too short a time, no crystalline product is realized. Extreme conditions may also result in the formation of materials other than zeolite ZK-4.

The resulting crystalline synthetic aluminosilicate zeolite is one having the negative electrovalence of the aluminosilicate balanced by a cation consisting essentially of about 80 to about 90 percent sodium oxide and about 10 to about 20 percent of a methyl ammonium oxide, which zeolite is further characterized by a uniform effective pore diameter of about 5.5 Angstroms. When potassium is substituted for sodium the uniform effective pore diameter is reduced to below about 5 Angstroms.

Sodium oxide present in the reaction mixture may be derived from sodium aluminate or an amorphous sodium aluminosilicate gel. The latter is characterized by the following composition:

$$Na(AlO_2 \cdot XSiO_2)$$

where X is a number in approximate range 0.5 to 20. This material may be prepared by reaction of ethyl orthosilicate and sodium aluminate. Silica present in the reaction mixture may be derived from a variety of sources, for example, silica gel, silica hydrosol and silicate esters. At the time of mixing with sodium aluminate, however, at least a portion of the silica should be solubilized in the form of tetramethylammonium silicate.

There are critical distinctions in the composition and sorption characteristics of zeolite ZK-4 and zeolite A. Zeolite ZK-4 contains more silicon and less aluminum than zeolite A. Thus, the unit cell formula for a typical dehydrated zeolite ZK-4 is:

$$Na_{7.5\pm 2}H_{2\pm.5}[9\pm 2AlO_2 \cdot 15\pm 2SiO_2]$$

while that of zeolite A is $Na_{12}[12AlO_2 \cdot 12SiO_2]$. As is well known, the silicon-oxygen bond distance is shorter than the aluminum-oxygen bond distance. Zeolite ZK-4 accordingly, as observed by X-ray diffraction analysis, has a contracted lattic in comparison with zeolite A.

The unit cell formulae of zeolite ZK-4 and zeolite A show that the former contains fewer sodium ions associated with the lattice of 24 silicon plus aluminum tetrahedra than does zeolite A. A striking difference in the sorptive properties of these two zeolites has been observed. The following table summarizes the differences in chemical and physical properties observed for the two zeolites:

| | $Na_2O$ | $Al_2O_3$ | $SiO_2$ | Lattice Parameter, $a_0$ | Sorption, g./100 g. Zeolite | | | |
|---|---|---|---|---|---|---|---|---|
| | | | | | $H_2O$ | $n\text{-}c_6H_{14}$ | Cyclohexane | 3-Methylpentane |
| Zeolite 4A | 25 | 25 | 50 | [1] 12.32±.02 | 24 | <1 | <1 | <1 |
| Zeolite ZK-4 | 15–20 | 19–21 | 60–65 | [1] 12.18±.05 | 20–25 | 8–13 | <1 | <1 |

[1] Angstrom.

It will be seen from the foregoing that while both zeolite 4A and zeolite ZK-4 possessed good sorption characteristics for water and the property of excluding cyclohexane and 3-methylpentane, there was a marked difference in the sorption characteristics of the two zeolites as regards the sorption of n-hexane. Thus, while zeolite 4A was incapable of sorbing n-hexane to any appreciable extent, zeolite ZK-4 exhibited good sorption characteristics for this straight chain hydrocarbon while excluding a branch chain hydrocarbon (3-methylpentane), and a cyclic hydrocarbon (cyclohexane). This latter property of zeolite ZK-4, is, in so far as is known, unique. Such selective sorption characteristic, moreover, is extremely valuable in effecting separation of straight chain hydrocarbons from a mixture thereof with branch chain or cyclic hydrocarbons, such as occurs in petroleum and obviates the heretofore necessity of replacing the initially formed sodium ions of zeolite A with at least about 40 percent of calcium ions in order to provide an adsorbent with the above-noted sorption characteristics.

In addition to the adsorption characteristics, the rejection characteristics of zeolite ZK-4 are important. The interstitial channels of this zeolite are such that at their narrowest points, molecules with critical dimensions greater than about 5.5 Angstroms will not readily enter into the channels. Accordingly, molecules having critical dimensions greater than approximately 5.5 Angstroms will be rejected by the zeolite, while those having smaller critical dimensions will be adsorbed.

Another property of zeolite ZK-4 which contributes to its usefulness is that of adsorbing relatively large quantities of adsorbate at either very low pressures or concentrations. The novel zeolite described herein can therefore be utilized as a selective adsorbent in numerous gas or liquid separation processes, whereby small molecules sucs as water are separated from mixtures with other materials. The zeolite may also find use in cyclic adsorption-desorption processes for water and other adsorbates.

Zeolite ZK-4 may be used as an adsorbent for purposes indicated above in any suitable form. For example, a column of powder crystalline material may afford excellent results may a pelleted form obtained by pressing into pellets a mixture of zeolite ZK-4 and a suitable bonding agent, such as clay.

The adsorbents contemplated herein include not only the sodium form of zeolite ZK-4 as synthesized above from a sodium-aluminum-silicate-tetramethylammonium-water system with sodium as the exchangeable cation but also crystalline materials obtained from such a zeolite by partial or complete replacement of the sodium ion with other cations. The sodium cations can be replaced, at least in part, by other ions including monovalent or divalent cations, such as lithium and magnesium; metal ions in Group I of the Periodic Table such as potassium and silver; Group II metal ions such as calcium and strontium; metal ions of the transition metals such as nickel, the rare earth metals such as cerium, lanthanum, praseodymium, neodymium, samarium and mixtures thereof with each other and the other rare earths; and other ions, for example, hydrogen and ammonium which behave in zeolite ZK-4 as metals in that they can replace metal ions without causing any appreciable change in the basic structure of the zeolite crystal. The transition metals are those whose atomic numbers are from 21 to 28, from 39 to 46 and from 72 to 78 inclusive, namely scandium, titanium, vanadium, chromium, manganese, iron, cobalt, nickel, yttrium, zirconium, niobium, molybdenum, ruthenium, rhodium, palladium, platinum, hafnium, tantalum, tungsten, rhenium, osmium and iridium.

Ion exchange of the sodium form of zeolite ZK-4 may be accomplished by conventional methods. A preferred continuous method is to pack zeolite ZK-4 into a series of vertical columns and successively pass through the beds a water solution of a soluble salt of the cation to be introduced into the zolite; and change the flow from the first bed to the second bed as the zolite in the first bed becomes ion exchanged to the desired extent. The spatial arrangement of the aluminum, silicon and oxygen atoms which make up the basic crystal lattice of the zeolite remains essentially unchanged by partial or complete substitution of the sodium ion by other cations. Thus, for example, the unit cell formula for the potassium form of zeolite ZK-4 obtained upon ion exchange of the initially prepared sodium form is:

$$K_{7.5\pm2}Na_{2\pm.5}[9\pm2Al_2O_2\cdot15\pm2SiO_2]$$

In identification of zeolites, the X-ray powder diffraction pattern has been found useful. X-ray diffraction powder patterns of zeolite ZK-4 were obtained utilizing standard techniques. The radiation was the $K\alpha$ doublet of the copper and a Geiger counter spectrometer with a strip chart pen recorder was used. The peak heights, I, and the positions as a function of $2\phi$, where $\phi$ is the Bragg angle, where read from the spectrometer chart. From there, the relative intensities, $$\frac{100I}{I_0}$$

where $I_0$ is the intensity of the strongest line or peak and $d$ (obs), the interplanar spacing in A, corresponding to the recorded lines were calculated. X-ray powder diffraction data for zeolite ZK-4 is set forth hereinbelow.

The following examples will serve to illustrate the method of the present invention:

EXAMPLE 1

An amorphous sodium aluminosilicate gel served as the sole source of sodium and aluminum in the method of this example. Such gel was prepared by reacting 490 grams of ethyl orthosilicate $[(C_2H_5O)_4Si]$ with 1880 cc. of an aqueous solution containing 87.5 grams of sodium hydroxide and 530 grams of sodium aluminate. The reaction was conducted at reflux temperature (which initially was 100° C. and at completion of reaction was 83° C.). The rate of reaction, controlled by the rate of stirring of the immiscible mixture, was such as to require 1.5 to 2.0 hours for completion. The reaction is shown by the equation:

$$NaAlO_2 + x(C_2H_5O)_4Si + 2xH_2O \rightarrow Na(AlO_2 \cdot xSiO_2) + 4xC_2H_5OH$$

The resulting solid product was collected and washed free of alcohol and excess alkali. After drying in air, it was found to have the following composition:

| | Wt. percent |
|---|---|
| $SiO_2$ | 17.7 |
| $Al_2O_3$ | 17.5 |
| $Na_2O$ | 10.7 |
| $H_2O$ | 45.8 |

Eight and two-tenths (8.2) ml. of a commercially available hydrosol of colloidal silica (Ludox) containing 0.31 grams $SiO_2$/ml. were dissolved in 36 ml. of 2.4 N tetramethylammonium hydroxide solution. The resulting solution consisted of 44 ml. of 1 molar tetramethylammonium metasilicate, $[(CH_3)_4N]_2SiO_3$.

Ten grams of the prepared amorphous sodium aluminosilicate was slurried with stirring and reflux in the above-described tetramethylammonium silicate solution for 72 hours, at which time the reaction mixture had an $SiO_2/Al_2O_3$ ratio of 4.5/1. The solid product obtained in such mixture was collected by centrifuging and washed with distilled water. After purging with nitrogen at 350° C., the product was found to have the following analyses:

| | Mole percent |
|---|---|
| $SiO_2$ | 61.7 |
| $Al_2O_3$ | 20.0 |
| $Na_2O$ | 18.3 |

Sorptive characteristics of the product for water, cyclohexane and n-hexane are shown below:

| | Grams/100 gram solid |
|---|---|
| Water | 19.05 |
| Cyclohexane | 0.94 |
| n-Hexane | 9.44 |

The crystalline product obtained was subjected to X-ray diffraction analysis and found to have the X-ray powder diffraction pattern set forth below in Table I:

Table I

| $d(\text{Å})$ | $I/I_0 \times 100$ |
|---|---|
| 12.08 | 100 |
| 9.12 | 29 |
| 8.578 | 73 |
| 7.035 | 52 |
| 6.358 | 15 |
| 5.426 | 23 |
| 4.262 | 11 |
| 4.062 | 49 |
| 3.662 | 65 |
| 3.391 | 30 |
| 3.254 | 41 |
| 2.950 | 54 |
| 2.725 | 10 |
| 2.663 | 7 |
| 2.593 | 15 |
| 2.481 | 2 |
| 2.435 | 1 |
| 2.341 | 2 |
| 2.225 | 2 |
| 2.159 | 4 |
| 1.121 | 5 |
| 2.085 | 2 |
| 2.061 | 2 |
| 2.033 | 5 |
| 1.90 | 2 |
| 1.880 | 2 |
| 1.828 | 1 |
| 1.813 | 1 |
| 1.759 | 1 |
| 1.735 | 1 |
| 1.720 | 5 |
| 1.703 | 1 |
| 1.669 | 2 |
| 1.610 | 1 |
| 1.581 | 2 |
| 1.559 | 1 |

EXAMPLE 2

Sodium aluminate (21.5 grams) containing 36.5 weight percent $Na_2O$ and 41 weight percent $Al_2O_3$ was dissolved in 250 ml. of water.

Silica gel (20.25 grams) was dissolved by heating to 100° C. with 285 ml. of 2.49 N tetramethylammonium hydroxide solution. The resulting solution was filtered to remove traces of undissolved silica.

The sodium aluminate solution and the tetramethylammonium silicate solution so obtained were each heated to boiling and the silicate was added rapidly to the aluminate with stirring. A precipitate formed immediately. After 2 minutes, stirring was stopped. The mixture was heated at 100° C. for 24 hours. The reaction mixture had a $SiO_2/Al_2O_3$ ratio of 3.9 to 1. The solid product was collected and washed with 1 liter of water. After purging with nitrogen at 350° C., the product was found to have the following analyses:

Mole percent
- $SiO_2$ ---- 59.8
- $Al_2O_3$ ---- 21.0
- $Na_2O$ ---- 19.3

X-ray diffraction indicated the cubic lattice to have a parameter, $a_0$ of 12.23, compared with 12.32 for zeolite A.

Sorptive characteristics of the product for water, cyclohexane, n-hexane and 3-methylpentane are shown below:

Grams/100 gram solid
- Water ---- 18.5
- Cyclohexane ---- .64
- n-Hexane ---- 8.02
- 3-methylpentane ---- .13

A portion of the product was treated with excess, saturated calcium chloride solution for 0.5 hour. After washing, drying and purging at 350° C., the resulting material had the following properties:

MOLE PERCENT
- $Na_2O$ ---- 1.4
- $CaO$ ---- 18.3
- $Al_2O_3$ ---- 21.3
- $SiO_2$ ---- 59.0

SORPTION, G./100 G. SOLID
- Cyclohexane ---- .396
- Water ---- 21.2
- n-Hexane ---- 10.5
- 3-methylpentane ---- .79

EXAMPLE 3

A solution of 4.05 grams of silica gel in 50 ml. of 2.7 N tetramethylammonium hydroxide was added rapidly with stirring to a solution of 4.3 grams of sodium aluminate dissolved in 50 ml. of water. The resulting mixture, having a $SiO_2/Al_2O_3$ molar ratio of 4/1, was refluxed for two days with the stirrer stopped after formation of the solid amorphous phase.

The solid product was collected and washed with 500 ml. of water. After drying and purging at 350° C., the product was found to possess the following properties:

MOLE PERCENT
- $Na_2O$ ---- 19.4
- $Al_2O_3$ ---- 20.7
- $SiO_2$ ---- 59.9

SORPTION, G./100 G. SOLID
- Cyclohexane ---- .5
- Water ---- 22.6
- n-Hexane ---- 6.8

The compositions of the zeolite ZK-4 product obtained from Examples 1, 2 and 3 all have $Na_2O/Al_2O_3$ molar ratios less than 1. This establishes that another cation, i.e. a methylammonium ion, is present in the lattice since the number of equivalents of cation in zeolites must equal the number of equivalents of aluminum in the lattice.

EXAMPLE 4

An amorphous sodium aluminosilicate was prepared as described in Example 1 using appropriate quantities of ethyl orthosilicate and sodium aluminate to yield a product with the composition:

Mol percent
- $Na_2O$ ---- 9.7
- $Al_2O_3$ ---- 8.4
- $SiO_2$ ---- 82.0

Approximately 0.2 gram of zeolite ZK-4, 10 grams of the above-described gel and 55 ml. of 2.6 N tetramethylammonium hydroxide solution were mixed and heated at reflux temperature for 13.5 hours. The resulting product was established by X-ray analysis and sorption measurements to be zeolite ZK-4.

EXAMPLE 5

A reaction mixture was prepared using the amorphous sodium aluminosilicate gel described in Example 4. In this instance, tetra-n-propylammonium hydroxide solution was used instead of tetramethylammonium hydroxide. The same molar ratio of reactants was used as described in Example 4. The mixture was heated at reflux temperature for 48 hours. The resulting crystalline product was not zeolite ZK-4 as evidenced by its failure to sorb more than 1 percent n-hexane.

EXAMPLE 6

A reaction mixture was prepared in the same manner as described in Example 4 except trimethylphenylammonium hydroxide solution was used instead of tetramethylammonium hydroxide. After refluxing for 25 hours, two liquid phases were observed in the reaction mixture. The upper phase was identified as dimethylaniline, an expected degradation product of trimethylphenylammonium hydroxide. The solid phase was found to be amorphous.

EXAMPLE 7

A reaction was conducted using the amorphous sodium aluminosilicate described in Example 4 except sodium hydroxide was used instead of tetramethylammonium hydroxide. In this reaction, sufficient sodium hydroxide solution was used to give the same molar ratio of reactants as described in Example 4. After refluxing for 27 hours, a crystalline product was obtained which was found to be a zeolite other than zeolite ZK-4 as evidenced by sorption of 7.4 percent cyclohexane.

EXAMPLE 8

A reaction was conducted in the same manner using the same reactants as described in Example 7 except that 0.2 gram of sodium zeolite ZK-4 was added to the reaction mixture. After refluxing for 16.5 hours, a crystalline product other than zeolite ZK-4 was obtained as evidenced by the ability of this material to sorb water and its inability to sorb n-hexane.

EXAMPLE 9

One hundred grams of the amorphous sodium aluminosilicate described in Example 4 was mixed with 2 grams of the zeolite product of Example 4. The solid mixture was introduced into 550 ml. of 2.65 N tetramethylammonium hydroxide solution. This mixture was heated to reflux for 17 hours. The solid product obtained was collected and washed with a liter of water. After purging with air at 350° C., the resulting zeolite was found to have the ability to sorb 12.3 percent n-hexane, 0.55 percent cyclohexane and 22.9 percent water. An ignited sample of this zeolite had the following composition:

| | Mole percent |
|---|---|
| $Na_2O$ | 17.0 |
| $Al_2O_3$ | 19.6 |
| $SiO_2$ | 63.5 |

A portion of the purged sample was treated with 100 ml. of hot (70° C.) 1 N sodium hydroxide solution for 0.5 hour. A portion of the unpurged zeolite was treated similarly with sodium hydroxide solution. The compositions of the resulting samples are set forth below:

| | Mol Percent | | | |
|---|---|---|---|---|
| | $Na_2O$ | $Al_2O_3$ | $SiO_2$ | n-hexane Sorption Weight Percent |
| Purged Sample | 17.0 | 19.6 | 63.5 | 12.3 |
| Purged Sample After NaOH Treatment | 19.5 | 19.2 | 61.3 | 10.2 |
| Unpurged Sample After NaOH Treatment | 17.4 | 19.7 | 63.0 | 12.3 |

The above data demonstrate that the unpurged zeolite ZK-4 contains a cation which is too large to be exchanged from the crystal lattice, such as tetramethylammonium ion. However, purging with air at 350° C. results in formation of a cation which is capable of passing through the lattice framework and being replaced by sodium ion.

EXAMPLE 10

To a solution of 3.45 g. of sodium aluminate in 10 ml. of water was added 0.3 g. of zeolite ZK-4 as seed. A solution of 36.75 g. of tetramethylammonium disilicate pentahydrate $[(CH_3)_4NHSiO_3 \cdot 5H_2O]$ in 59 ml. of 2.47 N tetramethylammonium hydroxide solution was added with stirring to the sodium aluminate-zeolite ZK-4 mixture. When the voluminous precipitate so obtained was smooth, the mixture was placed, without stirring, in a bath at 100° C. After 39 hours the crystallization of the precipitate was complete. The solid product was collected on a funnel and rinsed with water. After purging with air at 350° C. this material sorbed 12.5% of its own weight of n-hexane, 0.5% cyclohexane and 24.8% water. The zeolite ZK-4 thus obtained had a $SiO_2/Al_2O_3$ molar ratio of 3.4. Attention is directed to the ratio for the product obtained in Example 2 where $SiO_2/Al_2O_3$ is 2.85/1. These two examples illustrate that zeolite ZK-4 cannot be considered to have a fixed composition. However, the n-hexane sorbive capacities of the zeolite ZK-4 samples obtained from Examples 2 and 10 are 8.0% and 12.5% respectively, suggesting that the sorptive capacity for straight chain hydrocarbons increases as the silica content increases.

The crystalline product obtained was subjected to X-ray diffraction analysis and found to have the X-ray powder diffraction pattern set forth belowe in TABLE II:

Table II

| $d(A°)$ | $I/I_0 \times 100$ |
|---|---|
| 12.07 | 100 |
| 8.57 | 100 |
| 7.025 | 71 |
| 5.422 | 50 |
| 4.275 | 23 |
| 4.062 | 11 |
| 3.662 | 48 |
| 3.390 | 59 |
| 3.244 | 33 |
| 2.950 | 64 |
| 2.862 | 60 |
| 2.727 | 14 |
| 2.661 | 8 |
| 2.593 | 4 |
| 2.481 | 13 |
| 2.435 | 2 |
| 2.341 | 1 |
| 2.225 | 2 |
| 2.162 | 2 |
| 2.120 | 2 |
| 2.080 | 1 |
| 2.061 | 1 |
| 2.033 | 1 |
| 1.904 | 4 |
| 1.881 | 2 |
| 1.835 | 1 |
| 1.813 | 1 |
| 1.751 | 1 |
| 1.737 | 1 |
| 1.718 | 1 |
| 1.669 | 4 |
| 1.653 | 4 |
| 1.611 | 1 |
| 1.595 | 1 |
| 1.579 | 1 |
| 1.558 | 2 |
| 1.510 | 1 |
| 1.501 | 1 |
| 1.465 | 1 |
| 1.45 | 1 |
| 1.415 | 1 |
| 1.405 | 1 |
| 1.385 | 1 |
| 1.349 | 1 |
| 1.345 | 1 |

EXAMPLE 11

Five grams of purged sodium form zeolite ZK-4 was placed in a Buchner funnel and treated with ten 25 ml. portions of 2 molar aqueous KCl solution at 60-70° C. The zeolite was then washed free of chloride ion and purged at 350° C. The resulting product sorbed only 5.2 g. of water per 100 g. of sample and X-ray nalysis indicated a major loss in crystallinity.

EXAMPLE 12

2.6 g of purged sodium form zeolite ZK-4 was treated as described in Example 11 except an aqueous solution of KOH and KCl was used, which was 2 molar with respect to potassium ion. The resulting zeolite sorbed 19.5 g. of water and 0.40 g. of n-hexane per 100 g. of sample.

Two important points are illustrated by Examples 11 and 12:

(1) The purged sodium form zeolite ZK-4 is undoubtedly sodium hydrogen zeolite ZK₄4, the hydrogen being the final degredation product of a methyl ammonium caton in the zeolite. Treatment of this zeolite with a neutral salt solution results in formation of an acid which attacks the zeolite lattice. A basic salt solution, however, neutralizes the acid and thus prevents lattice attack and effects successful cation exchange.

(2) Potassium zeolite ZK-4 can sorb water and exclude straight chain hydrocarbons, thus serving a desiccant for hydrocarbons.

It is to be understood that the above description is merely illustrative of preferred embodiments of the invention, of which many variations may be made by those skilled in the art without departing from the spirit thereof.

I claim:

1. A crystalline synthetic material having the composition:

0.1 to $0.3R:0.7$ to $1.0X_2O:1Al_2O_3:2.5$ to $4.0SiO_2 \cdot YH_2O$ where R is selected from the group consisting of a methyl ammonium oxide, hydrogen oxide and mixtures thereof with one another; X is selected from the group consisting of sodium and potassium and Y is any value from about 3.5 to about 5.5, said material being capable of selectively sorbing straight chain hydrocarbons of more than three carbon atoms from admixture of the same with non-straight chain hydrocarbons when X is sodium and capable of selectively sorbing water from admixture of the same with straight chain molecules having more than three carbon atoms in the chain when X is potassium.

2. A crystalline synthetic material having the composition:

0.1 to $0.3R:0.7$ to $1.0Na_2O:1Al_2O_3:2.5$ to $4.0SiO_2 \cdot YH_2O$ where R is selected from the group consisting of a methyl ammonium oxide, hydrogen oxide, and mixtures thereof with one another and Y is any value from about 3.5 to about 5.5, said material being capable of selectively sorbing straight chain hydrocarbons of more than three carbon atoms from admixture of the same with non-straight chain hydrocarbons.

3. A crystalline synthetic material having the composition:

0.1 to $0.3R:0.7$ to $1.0K_2O:1Al_2O_3:2.5$ to $4.0SiO_2 \cdot YH_2O$ where R is selected from the group consisting of a methyl ammonium oxide, hydrogen oxide and mixtures thereof with one another and Y is any value from about 3.5 to about 5.5, said material being capable of selectively sorbing water from admixture of the same with straight chain molecules having more than three carbon atoms in the chain.

4. A crystalline synthetic material having the composition:

0.1 to $0.3M_2O:0.7$ to $1.0X_2O:1Al_2O_3:2.5$ to $4.0SiO_2 \cdot YH_2O$ where M is a methyl ammonium ion; X is selected from the group consisting of sodium and potassium and Y is any value from about 3.5 to about 5.5.

5. A crystalline synthetic material having a composition expressed in terms of oxides as follows:

0.1 to $0.3M_2O:0.7$ to $1.0Na_2O:1Al_2O_3:2.5$ to $4.0SiO_2 \cdot YH_2O$ where M is a methyl ammonium ion and Y is any value from about 3.5 to about 5.5, said material being characterized by a structure having uniform effective pore dimensions of about 5.5 Angstroms in diameter.

6. A crystalline synthetic zeolite having the composition:

0.1 to $0.3R:0.7$ to $1.0Na_2O:1Al_2O_3:2.5$ to $4.0SiO_2 \cdot YH_2O$ where R is selected from the group consisting of a methyl ammonium oxide, hydrogen oxide and mixtures thereof with one another and Y is any value from about 3.5 to about 5.5, said zeolite having a uniform pore structure made up of pores of about 5.5 Angstroms in diameter and characterized by a unit cell formula of:

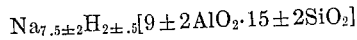

$$Na_{7.5 \pm 2}H_{2 \pm .5}[9 \pm 2AlO_2 \cdot 15 \pm 2SiO_2]$$

7. A crystalline synthetic aluminosilicate zeolite having the general formula:

0.1 to $0.3R:0.7$ to $1.0Na_2O:1Al_2O_3:2.5$ to $4.0SiO_2 \cdot YH_2O$ where R is selected from the group consisting of a methyl ammonium oxide, hydrogen oxide and mixtures thereof with one another and Y is any value from about 3.5 to about 5.5, and wherein the negative electrovalence of the aluminosilicate is balanced by cations, expressed as the oxides of sodium and methyl ammonium, consisting essentially of about 80 to about 90 percent sodium oxide and about 10 to about 20 percent of a methylammonium oxide, said zeolite being capable of selectively sorbing straight chain hydrocarbons of more than three carbon atoms from admixture of the same with non-straight chain hydrocarbons.

8. A crystalline synthetic aluminosilicate zeolite having the general formula:

0.1 to $0.3R:0.7$ to $1.0K_2O:1Al_2O_3:2.5$ to $4.0SiO_2 \cdot YH_2O$ where R is selected from the group consisting of a methyl ammonium oxide, hydrogen oxide and mixtures thereof with one another and Y is any value from about 3.5 to about 5.5, and wherein the negative electrovalence of the aluminosilicate is balanced by cations, expressed as the oxides of potassium and methyl ammonium, consisting essentially of about 80 to about 90 percent potassium oxide and about 10 to about 20 percent of a methyl ammonium oxide, said zeolite being capable of selectively sorbing water from admixture of the same with straight chain molecules having more than three carbon atoms in the chain.

9. A crystalline synthetic zeolite having the composition:

0.1 to $0.3R:0.7$ to $1.0Na_2O:1Al_2O_3:2.5$ to $4.0SiO_2 \cdot YH_2O$ where R is selected from the group consisting of a methyl ammonium oxide, hydrogen oxide and mixtures thereof with one another and Y is any value from about 3.5 to about 5.5, said zeolite having a unit cell formula of:

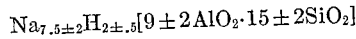

$$Na_{7.5 \pm 2}H_{2 \pm .5}[9 \pm 2AlO_2 \cdot 15 \pm 2SiO_2]$$

and possessing the ability of selectively sorbing straight chain molecules having more than three atoms in the chain from admixture of the same with non-straight chain molecules of more than three atoms.

10. A crystalline synthetic zeolite having the general formula:

0.1 to $0.3R:0.7$ to $1.0K_2O:1Al_2O_3:2.5$ to $4.0SiO_2 \cdot YH_2O$ where R is selected from the group consisting of a methyl ammonium oxide, hydrogen oxide and mixtures thereof with one another and Y is any value from about 3.5 to about 5.5, and a unit cell formula of:

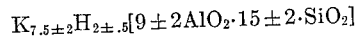

$$K_{7.5 \pm 2}H_{2 \pm .5}[9 \pm 2AlO_2 \cdot 15 \pm 2 \cdot SiO_2]$$

and possessing the ability of selectively sorbing water from admixture of the same with straight chain molecules having more than three atoms in the chain.

11. A method for synthesizing a crystalline material which comprises preparing a reaction mixture whose composition expressed in terms of oxide mole ratios falls within the following ranges:

$SiO_2/Al_2O_3$ of from about 2.5 to about 11

$\dfrac{H_2O}{Na_2O+[(CH_3)_4N]_2O}$ of from about 25 to about 50

$\dfrac{Na_2O+[(CH_3)_4N]_2O}{SiO_2}$ of from about 1 to about 2 and maintaining said mixture at a temperature within the range from about 20 to about 120° C. until said crystalline material is formed, separating said crystalline material from the reaction solution, and subjecting the separated crystalline material to an activation treatment by heating at a temperature in the approximate range of 200 to 600° C.

12. A method for synthesizing a crystalline aluminosilicate zeolite which comprises preparing a reaction mixture whose composition expressed in terms of oxide mole ratios falls within the following ranges:

$SiO_2/Al_2O_3$ of from about 2.5 to about 11

$\dfrac{H_2O}{Na_2O+[(CH_3)_4N]_2O}$ of from about 25 to about 50

$\dfrac{Na_2O+[(CH_3)_4N]_2O}{SiO_2}$ of from about 1 to about 2 and maintaining said mixture at a temperature within the approximate range of 100 to 120° C. until the aforesaid crystalline zeolite is formed, separating said crystalline zeolite from the reaction solution, and subjecting the separated crystalline zeolite to an activation treatment by heating at a temperature in the approximate range of 200 to 600° C.

13. A method for synthesizing a crystalline aluminosilicate zeolite which comprises preparing a reaction mixture whose composition expressed in terms of oxide mole ratios falls within the following ranges:

$SiO_2/Al_2O_3$ of from about 2.5 to about 11

$\dfrac{H_2O}{Na_2O+[(CH_3)_4N]_2O}$ of from about 25 to about 50

$\dfrac{Na_2O+[(CH_3)_4N]_2O}{SiO_2}$ of from about 1 to about 2 maintaining said mixture at a temperature within the approximate range of 20 to 120° C. until crystals of said zeolite are formed, separating the crystals from the mother liquor, and subjecting the separated crystals to an activation treatment by heating at a temperature in the approximate range of 200 to 600° C.

14. A method for synthesizing a crystalline aluminosilicate zeolite which comprises reacting an amorphous sodium aluminosilicate gel having the composition $$Na(AlO_2 \cdot XSiO_2)$$

where X is a number in the approximate range 0.5 to 20 with tetramethylammonium silicate, the resulting reaction mixture having a composition expressed in terms of oxide mole ratios within the following ranges:

$SiO_2/Al_2O_3$ of from about 2.5 to about 11

$\dfrac{H_2O}{Na_2O+[(CH_3)_4N]_2O}$ of from about 25 to about 50

$\dfrac{Na_2O+[(CH_3)_4N]_2O}{SiO_2}$ of from about 1 to about 2 maintaining said mixture at a temperature within the approximate range of 100° C. to 120° C. until crystals of said zeolite are formed, separating the crystals from the mother liquor, and subjecting the separated crystals to an activation treatment by heating at a temperature in the approximate range of 200 to 600° C.

15. A method for synthesizing a crystalline aluminosilicate zeolite which comprises reacting sodium aluminate with tetramethyl ammonium silicate, the resulting reaction mixture having a composition expressed in terms of oxide mole ratios within the following ranges:

$SiO_2/Al_2O_3$ of from about 2.5 to about 11

$\dfrac{H_2O}{Na_2O+[(CH_3)_4N]_2O}$ of from about 25 to about 50

$\dfrac{Na_2O+[(CH_3)_4N]_2O}{SiO_2}$ of from about 1 to about 2 maintaining said mixture at a temperature within the approximate range of 100° C. to 120° C. until crystals of said zeolite are formed, separating the crystals from the mother liquor, and subjecting the separated crystals to an activation treatment by heating at a temperature in the approximate range of 200 to 600° C.

16. A method for synthesizing a crystalline aluminosilicate zeolite which comprises reacting an amorphous sodium aluminosilicate gel having the composition $$Na(AlO_2 \cdot XSiO_2)$$

where X is a number in the approximate range 0.5 to 20 with tetramethyl ammonium hydroxide, the resulting reaction mixture having a composition expressed in terms of oxide mole ratios within the following ranges:

$SiO_2/Al_2O_3$ of from about 2.5 to about 11

$\dfrac{H_2O}{Na_2O+[(CH_3)_4N]_2O}$ of from about 25 to about 50

$\dfrac{Na_2O+[(CH_3)_4N]_2O}{SiO_2}$ of from about 1 to about 2 maintaining said mixture at a temperature within the approximate range of 100° C. to 120° C. until crystals of said zeolite are formed, separating the crystals from the mother liquor, and subjecting the separated crystals to an activation treatment by heating at a temperature in the approximate range of 200 to 600° C.

17. A method for synthesizing a crystalline aluminosilicate zeolite which comprises reacting sodium aluminate with a solution of tetramethylammonium disilicate pentahydrate in tetramethylammonium hydroxide, the resulting reaction mixture having a composition expressed in terms of oxide mole ratios within the following ranges:

$SiO_2/Al_2O_3$ of from about 2.5 to about 11

$\dfrac{H_2O}{Na_2O+[(CH_3)_4N]_2O}$ of from about 25 to about 50

$\dfrac{Na_2O+[(CH_3)_4N]_2O}{SiO_2}$ of from about 1 to about 2 maintaining said mixture at a temperature within the approximate range of 100° C. to 120° C. until crystals of said zeolite are formed, separating the crystals from the mother liquor, and subjecting the separated crystals to an activation treatment by heating at a temperature in the approximate range of 200 to 600° C.

18. A method for synthesizing a crystalline material having the composition:

0.1 to 0.3R:0.7 to $1.0Na_2O:1Al_2O_3:2.5$ to $4.0SiO_2 \cdot YH_2O$ where R is selected from the group consisting of a methyl ammonium oxide, hydrogen oxide and mixtures thereof with one another and Y is any value from about 3.5 to about 5.5 which comprises effecting crystallization of the same from a reaction mixture whose composition expressed in terms of oxide mole ratios falls within the following ranges:

$SiO_2/Al_2O_3$ of from about 2.5 to about 11

$\dfrac{H_2O}{Na_2O+[(CH_3)_4N]_2O}$ of from about 25 to about 50

$\dfrac{Na_2O+[(CH_3)_4N]_2O}{SiO_2}$ of from about 1 to about 2

19. A method for synthesizing a crystalline material which comprises effecting crystallization of a sodium aluminosilicate having the composition:

0.1 to $0.3R : 0.7$ to $1.0Na_2O : 1Al_2O_3 : 2.5$ to $4.0SiO_2 \cdot YH_2O$ where R is selected from the group consisting of a methyl ammonium oxide, hydrogen oxide and mixtures thereof with one another and Y is any value from about 3.5 to about 5.5 from a reaction mixture whose composition expressed in terms of oxide mole ratios falls within the following ranges:

$SiO_2/Al_2O_3$ of from about 2.5 to about 11

$\dfrac{H_2O}{Na_2O + [(CH_3)_4N]_2O}$ of from about 25 to about 50

$\dfrac{Na_2O + [(CH_3)_4N]_2O}{SiO_2}$ of from about 1 to about 2 and replacing at least a portion of the sodium cations of the resulting product with other cations.

20. A method for synthesizing a crystalline aluminosilicate zeolite which comprises preparing a reaction mixture whose composition expressed in terms of oxide mole ratios falls within the following ranges:

$SiO_2/Al_2O_3$ of from about 2.5 to about 11

$\dfrac{H_2O}{Na_2O + [(CH_3)_4N]_2O}$ of from about 25 to about 50

$\dfrac{Na_2O + [(CH_3)_4N]_2O}{SiO_2}$ of from about 1 to about 2 maintaining said mixture at a temperature within the approximate range of 20 to 120° C. until crystals of said zeolite are formed, separating the crystals from the mother liquor, and subjecting the separated crystals to an activation treatment by heating at a temperature in the approximate range of 200 to 600° C., so that the resultant crystalline aluminosilicate zeolite will be at least partially dehydrated.

References Cited by the Examiner

UNITED STATES PATENTS 2,882,243  4/1959  Milton _____ 23—113

OTHER REFERENCES

Barrer et al., "Transactions Faraday Society," vol. 54, pp. 1074–1085, July 1958.

TOBIAS E. LEVOW, *Primary Examiner.*

MAURICE A. BRINDISI, *Examiner.*

D. E. GANTZ, E. J. MEROS, *Assistant Examiners.*